United States Patent [19]

Fossum et al.

[11] Patent Number: 5,431,149

[45] Date of Patent: Jul. 11, 1995

[54] SOLAR ENERGY COLLECTOR

[76] Inventors: Michaele J. Fossum; Richard L. Fossum, both of 3819 Hunters Trail, San Antonio, Tex. 78230

[21] Appl. No.: 121,442

[22] Filed: Sep. 14, 1993

Related U.S. Application Data

[63] Continuation of Ser. No. 922,858, Jul. 31, 1992, abandoned.

[51] Int. Cl.⁶ .............................................. F24J 2/24
[52] U.S. Cl. ..................... 126/659; 126/661; 126/670; 126/906; 126/907
[58] Field of Search ............... 126/651, 652, 658, 659, 126/660, 661, 704, 705, 707, 906, 907

[56] References Cited

U.S. PATENT DOCUMENTS

| | | | |
|---|---|---|---|
| 3,981,293 | 9/1976 | Gillery | 126/901 |
| 4,027,652 | 6/1977 | Collura | 126/446 |
| 4,120,287 | 10/1978 | Marles et al. | 126/447 |
| 4,164,935 | 8/1979 | Marles et al. | 126/447 |
| 4,172,311 | 10/1979 | Heyman | 29/157 |
| 4,178,909 | 12/1979 | Goolsby et al. | 126/417 |
| 4,217,887 | 8/1980 | Hoffman et al. | 126/906 |
| 4,255,213 | 3/1981 | Redmond | 148/6.11 |
| 4,325,359 | 4/1982 | Fries | 126/438 |
| 4,338,921 | 7/1982 | Harder et al. | 126/446 |
| 4,426,998 | 1/1984 | DuBosque, Jr. | 126/448 |
| 4,867,133 | 9/1989 | Sadler | 126/906 |

FOREIGN PATENT DOCUMENTS

| | | | |
|---|---|---|---|
| 2806487 | 8/1979 | Germany | 126/446 |
| 3010268 | 9/1981 | Germany | 126/446 |
| 136056 | 8/1982 | Japan | 126/446 |

*Primary Examiner*—James C. Yeung
*Attorney, Agent, or Firm*—Gunn, Lee & Miller

[57] ABSTRACT

A solar energy collector comprising a plurality of heat absorbing modules formed by deforming two plates into intimate contact with parallel metallic pipes disposed intermediate the plates. The plates are secured together by rivets which are spaced along and traverse the deformed portions of the plates, thus providing a spring section to absorb unequal expansion of the plates and the fluid conducting pipes. The uppermost surface of the pair of plates is provided with a black body coating to emit infrared radiation when sunlight is incident thereon. A glazing is provided over such black body surface to freely transmit incident light to the black body surface but to reflect infrared heat energy emitted by the black body surface. Water or other heat transfer liquid flowing through the pipes is maintained at a sufficiently high pressure to produce a turbulent flow through the pipes to increase the efficiency of the heat transfer. Any size unit can be fabricated by assembling the modules in side by side and/or end to end relationship. Preferably, the collector encompasses horizontally parallel pipes with the inlet and outlet of the collector being on the same side.

3 Claims, 4 Drawing Sheets

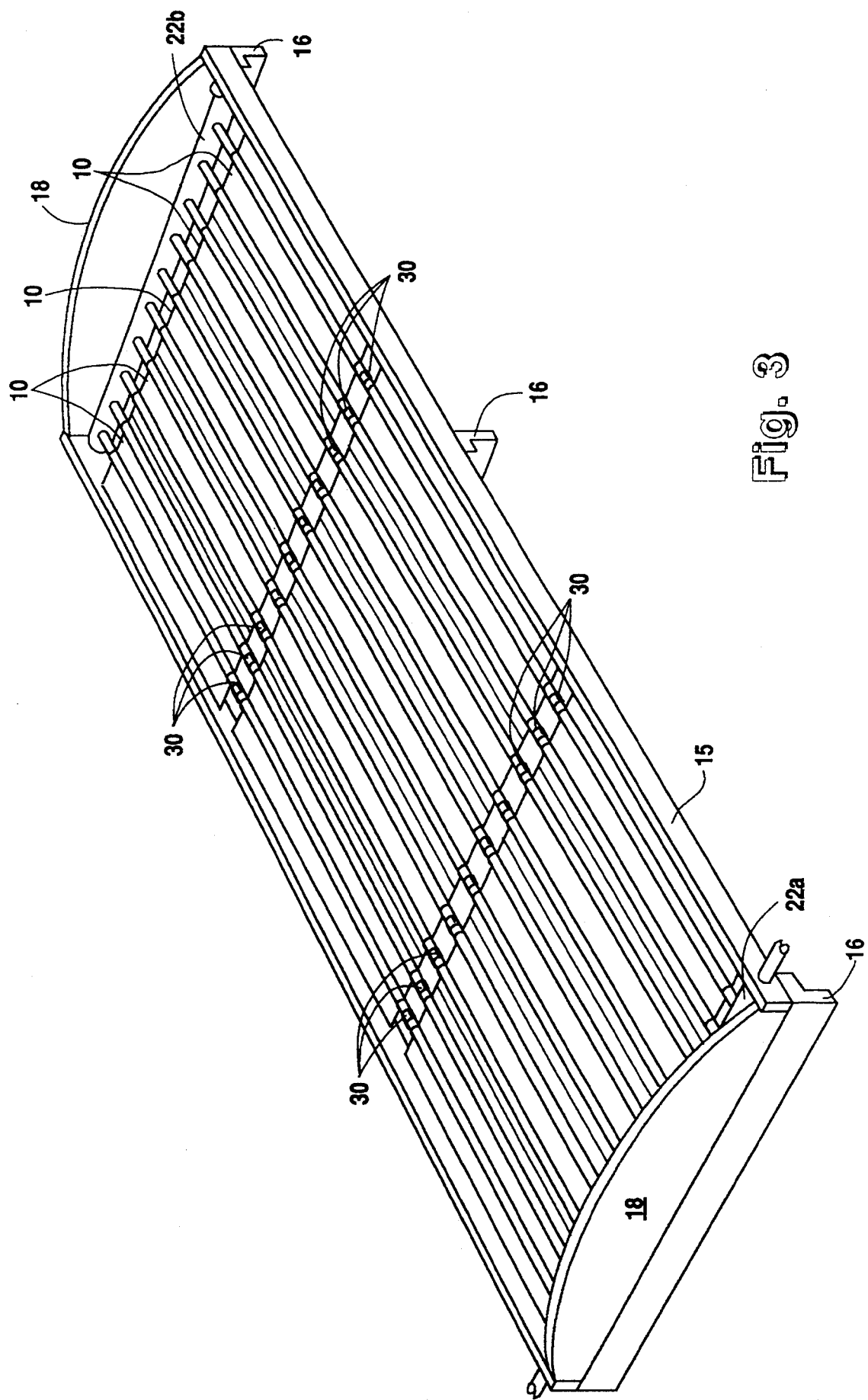

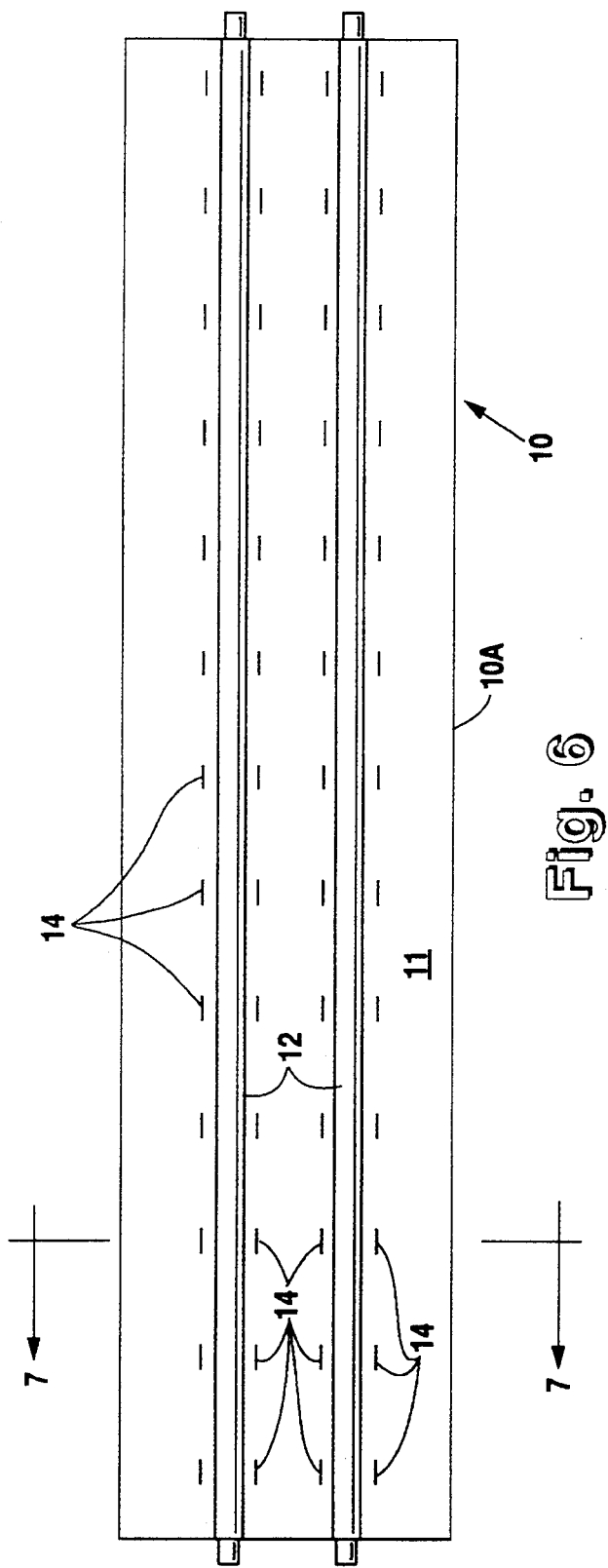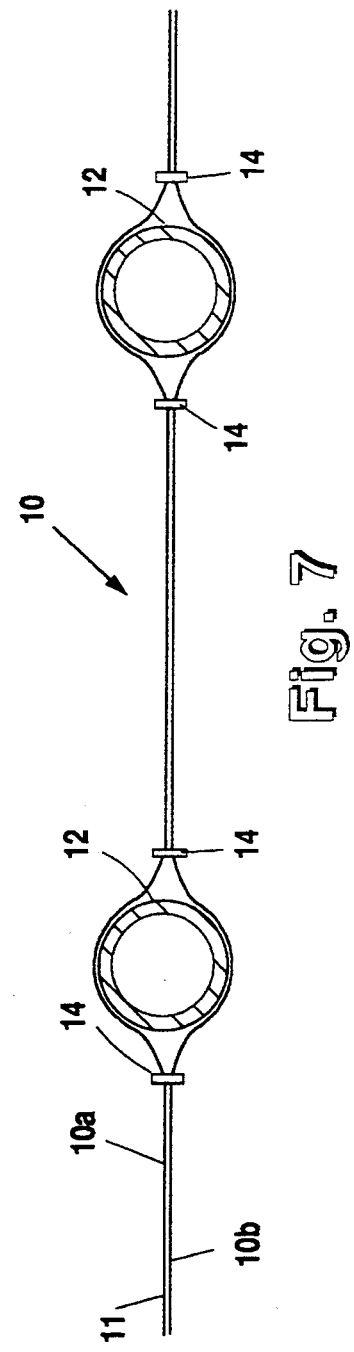

SOLAR ENERGY COLLECTOR

This is a continuation of application(s) Ser. No. 07/922,858 filed on Jul. 31, 1992, now abandoned.

BACKGROUND OF THE INVENTION

1. Field of the Invention

This invention relates to a collector for absorbing heat from incident solar energy and removing the absorbed heat by a heat transfer liquid, and particularly to a design and method of fabrication of a linear solar collector which substantially reduces the cost of manufacturing such units.

2. Summary of the Prior Art

Literally hundreds of patents have been issued on apparatus for collecting and transferring solar heat energy. In the common forms of such apparatus, the solar energy is incident on and absorbed by a metallic plate having a so-called "black body" coating thereon which effectively converts it to a black body type heat radiator. This black body surface is encased within a glazing of a transparent ceramic or plastic material and the inner surface of such glazing permits the transfer of light therethrough, but reflects back towards the heat absorbing black body plate substantially all infrared radiation emitted by the black body plate. Thus, the heat energy of the incident sunlight is trapped between the glazing and the heat absorbing black body plate. The heat developed in the black body plate is then transferred to a fluid which is generally conducted through metallic tubes or pipes lying in adjacent relationship to the black body heat absorbing plate. A layer of insulation is provided surrounding the lower surface of the black body plate and the pipes to prevent loss of heat in that direction.

Examples of common solar collectors are REDMOND, U.S. Pat. No. 4,255,213; HARDER, U.S. Pat. No. 4,338,921; FRIES, U.S. Pat. No. 4,325,359; GOOLSBY, U.S. Pat. No. 4,178,909; and HEYMAN, U.S. Pat. No. 4,172,311.

In each of the prior art patents, the need for an economical, yet efficient heat transfer solar collector is emphasized, but in every case, the prior art designs end up utilizing complicated shapes of plastic and/or metal for defining the heat absorbing element and the conduits for transmitting a heat transfer fluid in intimate relationship with the heat absorbing element. If a substantially wider or larger unit is desired for a particular installation, the solution was to hook up a plurality of small units by complicated plumbing connections or to custom design and manufacture a larger unit of the desired dimensions. Either way, the total cost was excessive. The prior art clearly indicates the need for a modular design of solar heat collector wherein a plurality of identical modules may be readily assembled to provide a large collector of any desired width or length, for use on large school, office, and similar buildings for the heating of the entire building or a large quantity of hot water, which may be readily fabricated without involving the use of a plurality of separate self contained heat absorbing modules interconnected by complex heat transfer fluid conduits, or having separate conduits leading to the source of heat transfer fluid and to the heat storage or utilization apparatus.

SUMMARY OF THE INVENTION

A solar heat collector embodying this invention comprises one or more elongated, generally rectangular heat absorbing metallic panels, each comprising two relatively thin plates of heat absorbing metal, such as aluminum or copper, which are deformed to snugly enclose around a plurality of parallel heat transfer pipes, preferably formed of copper. Thus the upper plate of heat absorbing metal covers substantially the top semi-cylindrical portions of the heat transfer fluid conducting pipes, while the lower plate is deformed to surround the bottom semi-cylindrical portions of the fluid transfer pipes. The plates and pipes are secured together by a plurality of metallic rivets or staples, preferably of stainless steel, which traverse the two plates at locations spaced along and traversing the edges of the pipe enclosing deformed portions of the two plates. Thus, the pipes are effectively resiliently secured in position, thereby readily accommodating differences in expansion of the plate elements and the heat transfer fluid pipes.

The frame for a solar collector embodying this invention is fabricated from U-shaped stainless steel or aluminum channels which are bolted or welded together. The ends of the plate elements are bolted to opposed channels. Headers for the heat transfer fluid conduits are welded to opposite ends of the supporting plates, hence permitting a single passage of heat transfer fluid across the length of the heat absorbing plates or, by appropriate design of the internal configuration of the headers, the heat transfer fluid may be directed along one portion of the heat absorbing plates in one direction and returned along the remaining portion of the heat absorbing plates in the opposite direction to exit from the header at the same end that the heat transfer fluid entered the first mentioned header. Conventional pads of rigid foam insulation may be supported by bottom frame elements secured to the channels beneath the heat absorbing plates. A standard dimension of glazing material, such as glass or suitable transparent plastic, may be sealingly secured to the top surfaces of the channels forming the rectangular frame.

It is therefore apparent that an effective solar collector may be economically fabricated by utilizing standard shapes and sizes of existing materials, eliminating the need for expensive machining or molding of materials, and eliminating complex installation procedures. More importantly, the size of the collector may be conveniently and economically increased. For a greater width, two or more of the twin plate panels may be positioned in side by side relationship and the frame formed of U shaped channels secured together to form a rectangle of a width and length corresponding to the width and length of the assembled panels. Headers at each end of the heat transfer fluid pipes of the respective panels directs the heat transfer fluid through all the pipes and the fluid input and output can be in the same end of the combined panels.

To increase the length of the solar heat absorbing panel, two or more of the twin plate panels are placed in end to end relationship and the adjacent ends of the pipes in the panels are joined by a brazed coupling to provide an elongated heat transfer fluid conduit. By applying appropriate headers to opposite ends of the fluid conduits, the heat transfer fluid entrance to and exit from the combined panels may again be on the same end of the assembled collector. Of course, the frame formed by the U shaped channels will be appropriately lengthened and cross bracing provided if needed. The glazing elements will be the same size as that for the single panel unit, but will be interconnected at their adjacent ends by a metallic band of a sidewise H shape to accommodate thermal expansion of the glazing elements.

Further advantages of the invention will be readily apparent to those skilled in the art from the following detailed description, taken in conjunction with the annexed sheets of drawings on which is shown a preferred embodiment of the invention.

BRIEF DESCRIPTION OF DRAWINGS

FIG. 3 is a schematic perspective view of FIG. 1 with the glazing cover removed for clarity of illustration.

FIG. 6 is an enlarged scale, top elevational view of a single heat absorbing panel, showing the location of the heat transfer fluid pipes and the rivets securing the heat absorbing plates and the heat transfer fluid pipes in a rigid assemblage.

FIG. 7 is an enlarged scale sectional view taken on the plane 7—7 of FIG. 6.

DESCRIPTION OF PREFERRED EMBODIMENT

Figure 1:
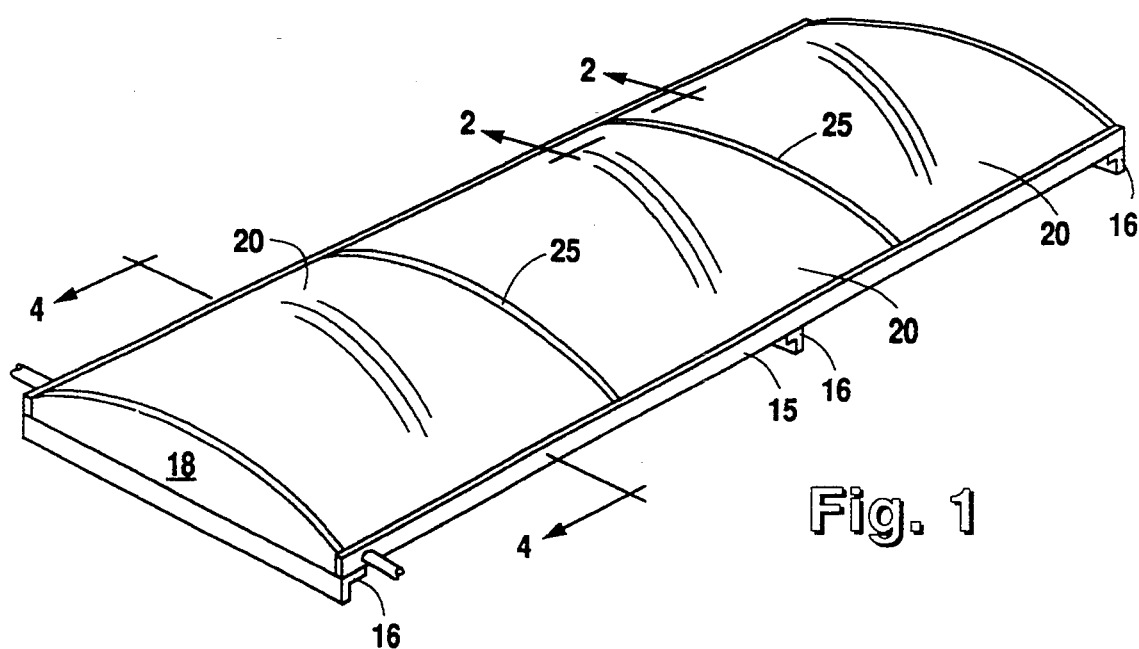
FIG. 1 is a perspective view of an assembled solar collector embodying this invention utilizing a plurality of heat absorbing panels disposed in side by side and end to end relationship.

The most important portion of any solar collector is the heat absorbing panel and its heat transfer relationship to the fluid transfer conduits or pipes. Referring first to FIGS. 6 and 7, there is shown a single module panel 10 having two heat transfer pipes 12 secured in intimate heat transfer relationship to the panel 10. Panel 10 actually comprises two thin plates 10a and 10b of aluminum or copper, or any other corrosive resistant metal which may be coated or treated to provide a black body heat radiating upper surface 11. The two strips 10a and 10b of such metal are preferably of a standard size such as 10" wide by 10' long. The pipes are of conventional size, say 1 to 2 inches in diameter, preferably fabricated from copper and, as shown in FIG. 6, are slightly longer than the metal plates 10a and 10b. The pipes 12 and the metal plates 10a and 10b are advanced through a simple roll type forming machine which effects the deforming of the top and bottom metal plates 10a and 10b to respectively conform to the semi-cylindrical top surfaces of the pipes 12 and the semi-cylindrical bottom surfaces of such pipes. The pipes 12 and the plates 10a and 10b are held in rigid assembly by a plurality of rivets or staples 14 which traverse the plates 10a and 10b at longitudinally spaced locations and traverse the deformed portions of the plates 10a and 10b. Thus, a spring is created by the deformed portions held by the rivets or staples 14 to permit compensation for unequal thermal expansion of the plates 10a and 10b and the pipes 12 during operation.

The upwardly facing surface of the assembled plates 10a and 10b is provided with a coating 11 which effectively converts that surface into a black body heat radiator. Such coatings are well known in the prior art.

Figure 2:
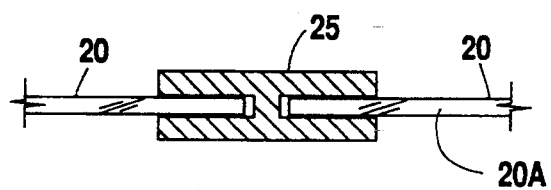
FIG. 2 is an enlarged scale, partial sectional view taken on the plane 2—2 of FIG. 1.
Figure 4:
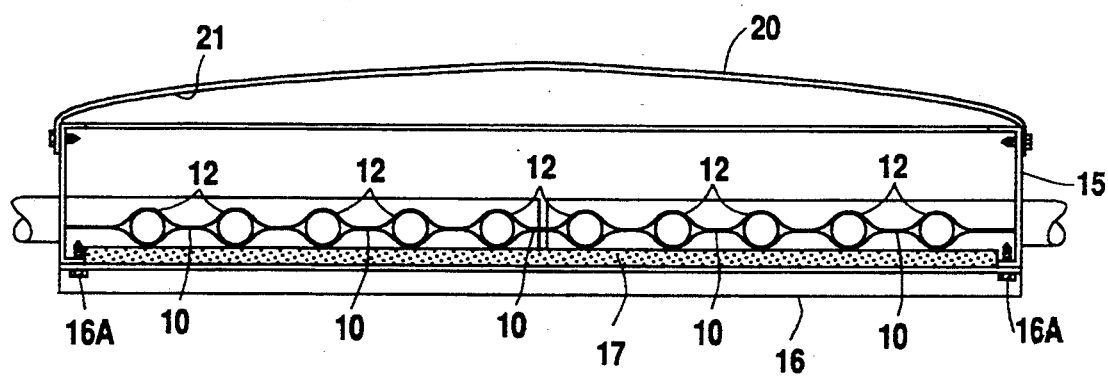
FIG. 4 is an enlarged scale sectional view taken on the plane 4—4 of FIG. 1.
Figure 5:
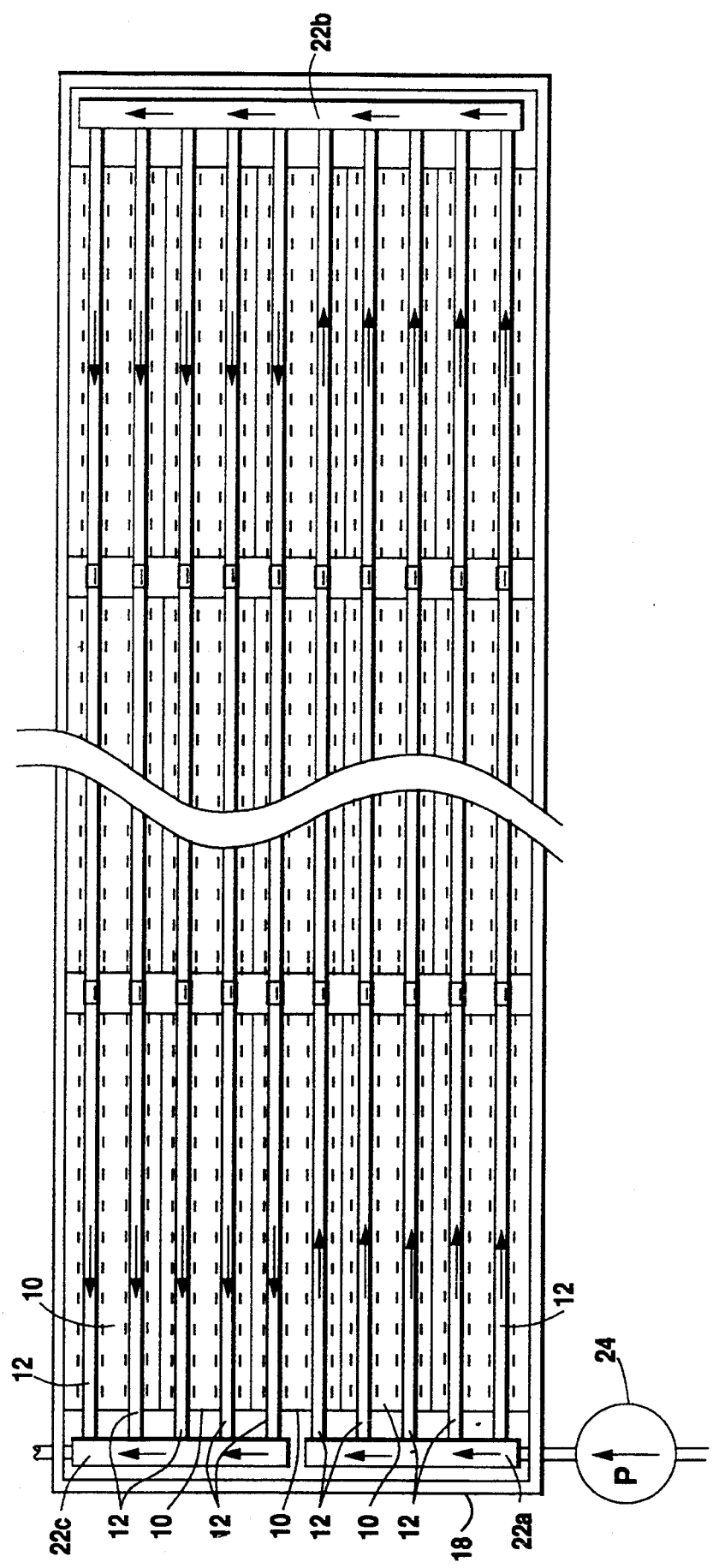
FIG. 5 is a schematic top elevational view of the heat transfer fluid conduits and their respective headers showing one potential direction of flow of the heat transfer fluid through the conduits.

Any number of heat absorbing panels 10, as shown in FIGS. 6 and 7, may be assembled in side by side or end to end relationship to provide a solar collector of the desired dimensions for the particular application. FIGS. 1 through 5 illustrate a solar collector having three modules connected in end to end relationship and five assemblies of three end to end connected modules of heat absorbing panels 10 mounted therein in side by side relationship. The end to end connected modules have the adjacent ends of pipes 12 connected by braised couplings 30 to provide continuous fluid paths along the entire length of the end to end connected modules.

A generally rectangular frame 15 is formed by welding channel-shaped elements, formed from aluminum or stainless steel, to form a rectangular frame conforming to the dimensions of the selected number and arrangement of modules. A plurality of bottom supports 16 may be secured by bolts 16A to frame 15 in transversely spaced relationship to assist in mounting the modules in the frame. A layer of insulation 17, such as ¾" rigid polyurethane foam or other insulating material, is placed within the frame 15 beneath the plates 10a and 10b and supported by the bottom supports 16. A chordal segment of metal 18 is secured in upstanding relation to each of the two lateral ends of the frame 15.

Standard curved pieces of glazing 20 are then secured to the top edges of the rectangular frame 15 and the upstanding chordal end elements 18 in conventional fashion. The adjacent edges of the glazing pieces 20 are mounted in arcuate bands 25 having a sidewise H-shaped configuration which permits longitudinal thermal expansion of the glazing pieces 20. Glazing pieces 20 may comprise glass or other plastic which is freely transparent to incident light. Preferably, a coating 21 is applied to the inner surface 20A of the glazing 20 which passes incident light, but accomplishes a reflection of infrared rays generated by the heating of the black body coated, heat absorbing plates 10a and 10b.

Prior to installation of the heating absorbing panels 10 within the frame 15, headers 22A and 22B are sealingly secured to opposite ends of the heat transfer pipes 12 and welded to the opposite ends of lower plate 10b (FIG. 7). While one header may be connected to an input source of cold fluid, such as water or other heat transfer fluid known in the art, and removed by the other header to a heat utilization apparatus, in the preferred form of the invention, shown in FIG. 5, the entering cold water flows through header 22A into half of the heat absorbing pipes 12 and is then transferred by a header 22B to return through the remaining pipes 12 to the opposite end of the heat absorbing unit where a third header 22C directs the hot fluid to a heat utilization apparatus (not shown). To improve the efficiency of the transfer of heat to the heat transfer liquid, a pump 24 (FIG. 5) is preferably mounted in the input line for the header 22A for the cold heat transfer liquid and such pump is operated so as to produce a sufficiently high pressure within each of the heat transfer fluid pipes 12 to result in a turbulent flow of fluid through such pipes. Such turbulent flow has been found to substantially increase the amount of heat transferred from the heat absorbing plate structure 10 to the pipes 12.

Modifications of this invention will be readily apparent to those skilled in the art and it is intended that all such modifications be included within the scope of the appended claims.

We claim:

1. A large rectangular solar heat absorber having a desired length and width of heat absorbing surface exposed to incident solar radiation, comprising:
   (1) a plurality of identical rectangular heat absorbing panels which, when assembled in side by side and end to end relationship will form a total heat absorbing surface area of the desired dimensions;
   (2) each said panel comprising:
      (a) a rectangular heat absorbing plate having a top surface to receive incident solar radiation;
      (b) a black body radiation coating on said top surface; and
      (c) one or more pipes secured in heat transferring relation to the bottom surface of said heat absorbing plate;
   (3) a rectangular frame dimensioned to mount a selected plurality of said panels in side by side and end to end relation to provide the desired width and length of heat absorbing surface;
   (4) a transparent cover of glazing material overlying said plurality of panels and having the property of reflecting infrared radiation emitted by said black body coating;
   (5) means for securing said transparent cover to said rectangular frame;
   (6) means connecting the adjacent ends of said pipes to provide heat transfer fluid flow paths extending the length of said end to end panels;
   (7) header means connected to the non-adjacent ends of said pipes for directing fluid flow through all of said heat transfer flow paths;
   (8) pump means for producing turbulent flow of heat transfer fluid through all of said pipes;
   (9) an inlet header connected to one end of a first set of pipes providing a fluid flow path to said first set of pipes;
   (10) an outlet header connected to one end of a second set of pipes providing a fluid flow path from said second set of pipes;
   (11) said inlet header and outlet header being on the same ends of said panels;
   (12) said connecting means providing horizontally parallel fluid flow paths; and
   (13) said header means directing fluid flow from said first set of pipes to said second sets of pipes, said second set of pipes having a fluid flow path in a direction opposite the fluid flow path of said first set of pipes.

2. The apparatus of claim 1 wherein each of said heat absorbing panels comprises two vertically stacked metallic plates respectively deformed to overlie the top and bottom half portions of each of said parallel pipes in heat transfer relation thereto.

3. The apparatus of claim 1 further comprising means for allowing spring in said plates to compensate for expansion.

* * * * *